Sept. 8, 1931. R. B. LAWTON 1,822,353
GLOBE MOVABLE IN MERIDIAN
Filed Jan. 4, 1930 2 Sheets-Sheet 1
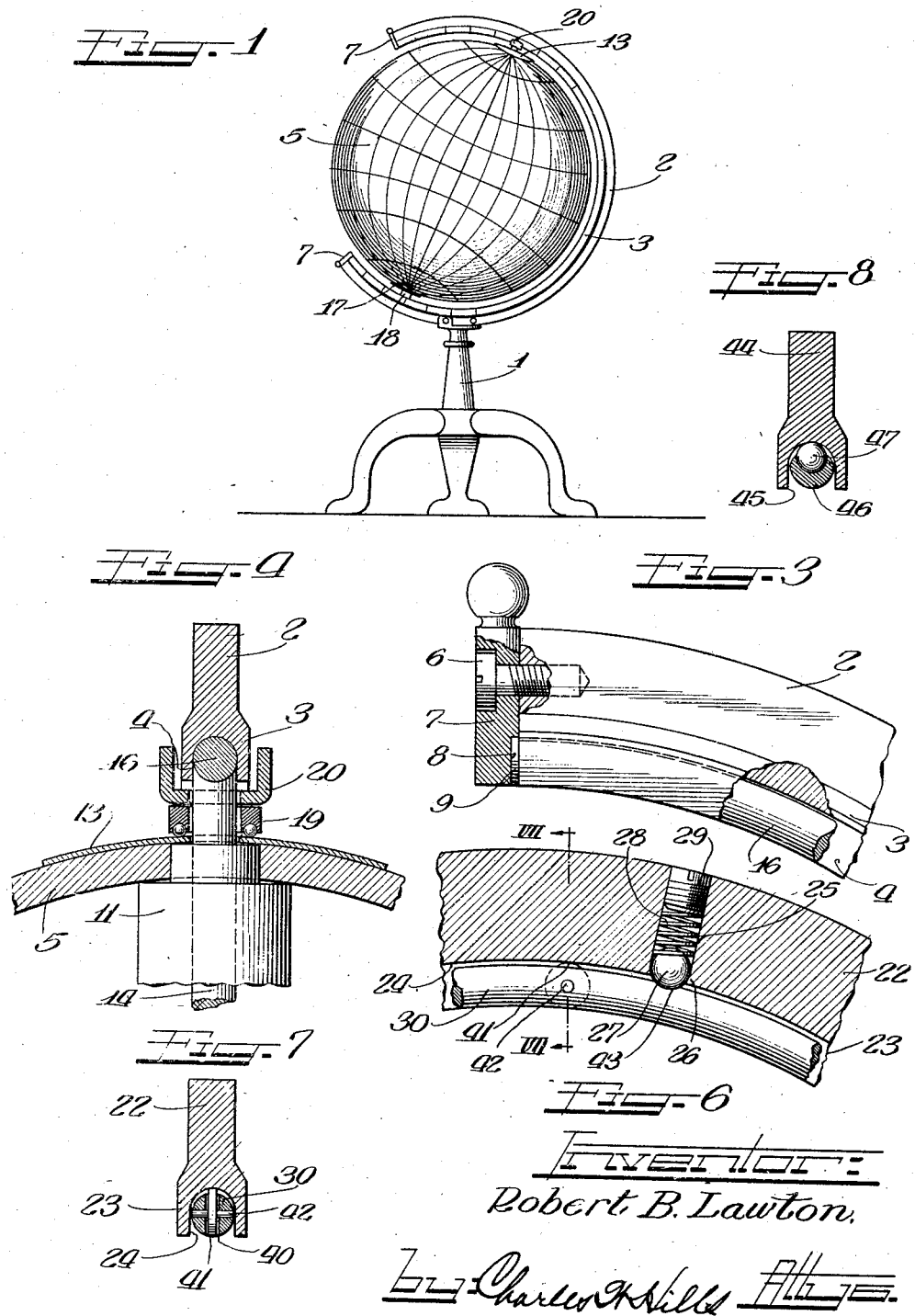

Sept. 8, 1931.   R. B. LAWTON   1,822,353
GLOBE MOVABLE IN MERIDIAN
Filed Jan. 4, 1930   2 Sheets-Sheet 2
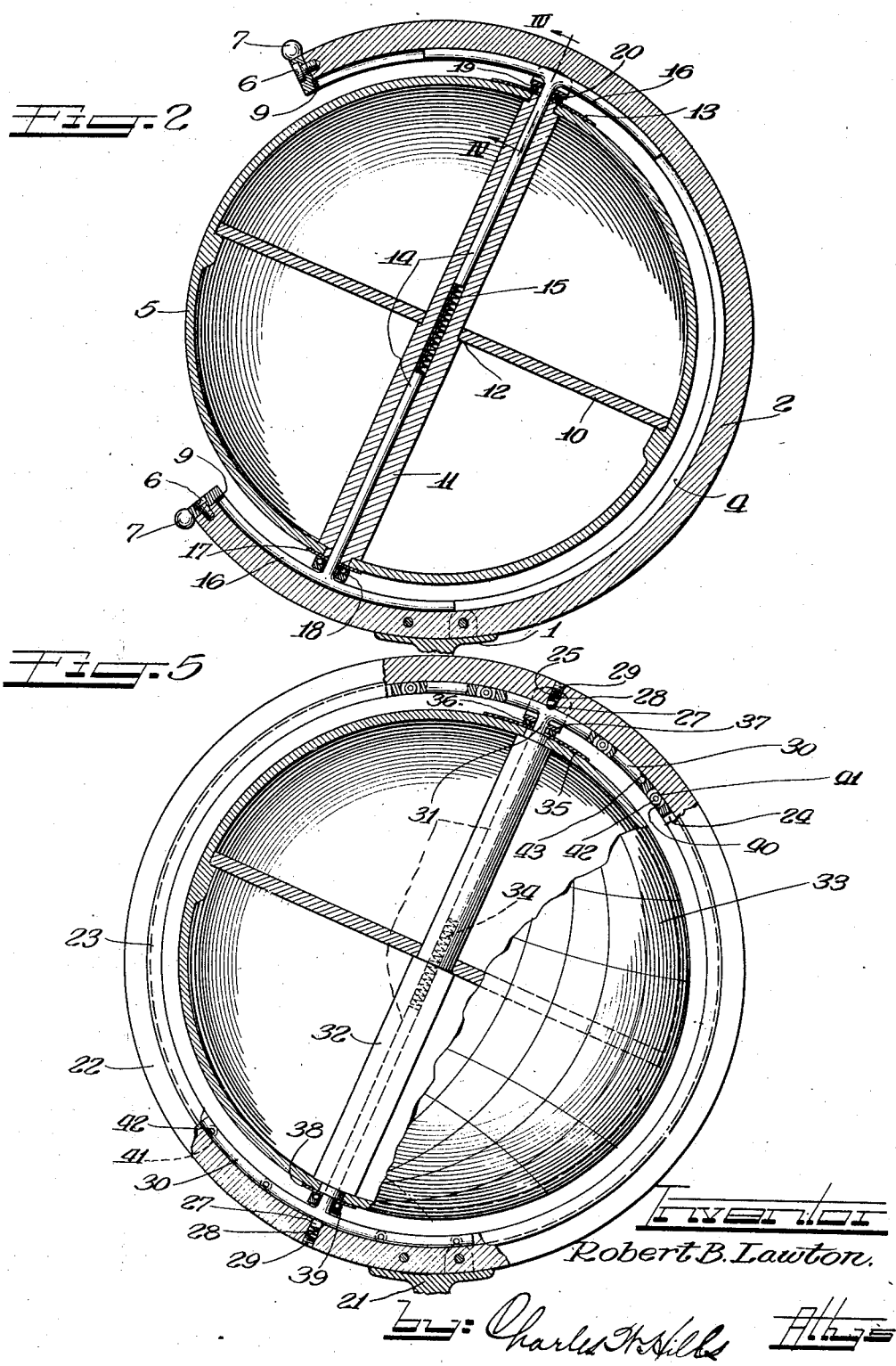

Patented Sept. 8, 1931

1,822,353

UNITED STATES PATENT OFFICE

ROBERT B. LAWTON, OF CHICAGO HEIGHTS, ILLINOIS, ASSIGNOR TO WEBER COSTELLO COMPANY, OF CHICAGO HEIGHTS, ILLINOIS, A CORPORATION OF ILLINOIS

GLOBE MOVABLE IN MERIDIAN

Application filed January 4, 1930. Serial No. 418,446.

This invention relates to improved terrestrial globes, and more particularly to a globe ball provided with an improved multiple piece spring axis which is movably mounted in a stationary meridian to afford an arrangement whereby the globe may be conveniently set and held in any desired position of adjustment with a substantially noiseless movement whereby the poles may be set at different degrees or angles to facilitate explaining of the various movements of the earth when the globe is used as a means for teaching.

It is an object of this invention to provide a terrestrial globe or the like wherein the meridian member is of the stationary type and has end members of an axis movably engaged therewith to permit the globe ball, which is rotatably mounted on the axis, to be shifted and set at different degrees or angles with a noiseless movement.

It is also an object of this invention to provide an improved globe mounting and globe wherein the globe is supported on a multiple piece spring-type axis having movable engagement with the meridian member forming part of the mounting to facilitate convenient adjustment of the globe to position the poles at any desired degree or angle.

It is a further object of this invention to provide a globe with a spring-controlled axis having end members movably engaged with a stationary meridian member which is provided with means whereby the movement of the axis with respect to the meridian may be arrested at predetermined points to permit the poles of the globe to be conveniently set at different degrees or angles to improve the usefulness of the globe as a medium for teaching.

It is furthermore an object of this invention to provide an improved type of globe which is adapted to be movably mounted within a meridian by means of an improved spring-type axis whereby the globe may be set and held in different positions without the use of set-screws or the like, affording a noiseless arrangement, obviating the wobbling of the globe ball, and producing a device of less weight at the upper part, so that there is no tendency of the device toward being top heavy.

It is an important object of this invention to provide an improved terrestrial globe of reduced weight and simplified construction wherein a stationary meridian has adjustably mounted therein end members provided on the pole ends of a spring-type sectional axis to afford an arrangement whereby the globe ball, rotatably supported on the axis, may be movably adjusted with respect to the meridian to permit the poles of the axis to be set at any desired degree or angle to improve the use of the globe as a teaching medium, as well as a convenience in the practical use of the globe.

Other and further important objects of the invention will be apparent from the disclosures in the specification and the accompanying drawings.

The invention (in a preferred form) is illustrated in the drawings and hereinafter more fully described.

On the drawings:

Figure 1 is a front elevational view of an improved globe and stand embodying the principles of this invention.

Figure 2 is an enlarged central sectional view of the globe and the meridian, with the axis members shown in elevation.

Figure 3 is an enlarged fragmentary detailed view of one end of the meridian illustrating one of the stop members for limiting the swing of the globe axis.

Figure 4 is an enlarged fragmentary detail section taken on line IV—IV of Figure 2, with parts shown in elevation.

Figure 5 is a fragmentary sectional view of a modified form of globe and meridian having an axis mechanism permitting adjusting of the globe within the meridian.

Figure 6 is an enlarged fragmentary sectional view taken longitudinally through the modified form of meridian illustrated in Figure 5.

Figure 7 is a detail cross-section taken on line VII—VII of Figure 6.

Figure 8 is a detail cross-section similar to that shown in Figure 7 covering a modified form of ball-race and ball bearing between the axis shoes and the meridian.

As shown on the drawings:

The reference numeral 1 indicates a pedestal, standard or base, having rigidly secured on the upper end thereof an arc-shaped or open meridian ring or member 2 constructed of metal or other suitable material having an enlarged inner peripheral rim section 3 provided with a guide groove or channel 4. The guide groove 4 has the ends thereof extending through the ends of the meridian to facilitate mounting of a globe ball. Each end of the meridian member 2 is provided with a threaded recess for the reception of a removable retaining screw 6 which projects through a stop post or end member 7 to removably hold the same against one end of the meridian to afford a stop for limiting the movement of the axis of the globe ball 5 as hereinafter more fully described. Each of the stop posts 7 is provided with a recess at 8 for the reception of a resilient block or rubber pad 9 to afford a cushion.

The globe ball 5 is reinforced in the interior by means of an inner reinforcing plate, disc or partition 10 having a central opening therein, through which a diametrically positioned bearing sleeve or axis housing 11 projects. The bearing sleeve or axis housing 11 is provided with a shoulder at 12 against which the partition or disc 10 is adapted to seat, as clearly illustrated in Figure 2. The ends of the bearing sleeve or axis housing 11 are of reduced diameter and tightly fit into openings at opposite ends of the globe ball 5 to afford a bearing support for the globe ball. Rigidly secured upon the North Pole end of the globe ball 5 around the upper end of the bearing sleeve or housing 11 is a time dial 13.

For the purpose of mounting the globe ball adjustably in the meridian 2, an improved axis is provided consisting of two shafts or axis sections 14 adapted to be projected into opposite ends of the globe bearing sleeve 11, with the inner ends of the shafts or axis sections contacting the ends of a coiled control spring 15 which is mounted within the bearing sleeve 11, as clearly illustrated in Figure 2. Rigidly secured on the outer end of each of the shafts or axis sections 14 is a guide segment or arc-shaped guide shoe 16 having a smooth rounded surface and adapted to seat in the curved longitudinally disposed groove 4 provided in the meridian 2. The axis is of the two-piece type with each of the pieces comprising the axis section 14 and an arc-shaped guide shoe 16, with the control spring 15 positioned between the inner ends of the axis sections 14 and acting to resiliently hold the arc-shaped guide shoes 16 in resilient frictional contact with the surfaces of the grooves 4 of the meridian 2. The improved spring-controlled two-piece axis affords a convenient arrangement whereby the globe ball may be moved with respect to the meridian so that the axis may be positioned at any desired degree or angle, with said axis serving to obviate wobbling of the globe ball and furthermore providing a substantially noiseless operation of the ends of the two-piece axis with respect to the meridian. Engaged around the outer end of the lower axis section 14 between the outer surface of the globe ball 5 and the lower guide shoe 16 is a washer or disc 17 and a ball bearing spacer ring or collar 18. Engaged around the North Pole end of the upper axis section 14 to the outside of the time dial 13 is a ball bearing spacer ring or collar 19 and a U-shaped finger piece or handle 20, the side flanges of which project upwardly beyond the opposite sides of the enlarged portion or inner section 3 of the meridian 2 to afford a convenient arrangement whereby the globe ball may be rocked back and forth within the meridian. After the globe ball, together with the two-piece axis engaged therein, has been mounted in the meridian 2 with the guide shoes 16 slidably engaged in the meridian groove 4, the stop posts 7 are adapted to be engaged on the ends of the meridian 2 by means of the mounting screws 6, as illustrated in Figure 2, with the rubber or resilient pads 9 positioned at the outer end of the groove 4 to afford resilient stop cushions against which the ends of the axis guide shoes 16 are adapted to contact in limiting the swing of the axis within the meridian.

Figures 5, 6 and 7 illustrate a modified form of a globe adapted to be adjustably shifted within a stationary meridian. In this form of the device, a base, standard or pedestal 21 is provided, and has rigidly supported thereon a continuous or endless meridian ring 22 constructed of metal or other suitable material and having an enlarged inner peripheral section 23 having a continuous guide groove or slot 24 in the inner peripheral surface thereof. The outer rim section of the meridian ring 22 is provided with a plurality of radial openings or pockets 25, the inner ends of which are slightly restricted to afford a ball seat 26 (Fig. 6) for a spring-controlled latch ball 27 which is rigidly held projecting outwardly through the seat by means of a control spring 28 of the coiled type which is seated in the pocket 25 and is retained in place by means of a screw plug 29 or the like.

The spring-controlled balls 27 project into the meridian groove 24, as clearly illustrated in Figure 6, and are positioned in the path of slidable movement of a pair of oppositely positioned guide shoes or arc-shaped arms 30 which are rigidly or integrally secured on the outer ends of a pair of shafts or axis sections 31, which are axially aligned and project toward one another, into the ends of a passaged axis bearing sleeve or housing 32 which is diametrically secured in a globe ball 33 of a type similar to that illustrated in Figure 2. Disposed in the bearing sleeve 32 between the ends of the North Pole axis section and the South Pole axis section is a control spring 34 which acts to resiliently hold the guide shoes or arc-shaped arms 30 resiliently seated in the groove 24 of the meridian 22. Engaged on the North Pole end of the globe ball 33 is a time dial 35, to the outside of which a ball-bearing spacer ring 36 and a finger piece or handle 37 are engaged. The finger piece 37 is of U-shape, similar to the finger piece 20 illustrated in Figure 4, and has the end flanges thereof projecting upwardly on opposite sides of the enlarged inner peripheral section 23 of the ring meridian 22. Engaged around the South Pole axis section between the South Pole end of the globe ball 33 and the lower guide shoe 30 is a washer 38 and a ball-bearing spacer ring 39. To facilitate movement of the axis guide shoes 30 in the groove of the meridian, each of the guide shoes 30 is provided with a plurality of openings 40 for the reception of a guide roller or disc 41 which is supported on a bearing pin 42 engaged diametrically through suitable openings in the shoe member 30, as clearly illustrated in Figure 7. The guide discs or rollers 41 project outwardly beyond the outer curved peripheries of the guide shoes 30 and have rolling contact with the peripheral surface of the meridian groove 24, so that, when the globe and the axis thereof are shifted or adjusted with respect to the meridian by shifting the same through the medium of the finger piece 37, the operation is substantially a noiseless one, due to the roller bearing arrangement between the axis guide shoes 30 and the peripheral wall of the meridian groove 24. The outer peripheral surfaces of the axis guide shoes 30 are provided with a plurality of spaced pockets or notches 43 in which the latch balls 27 are adapted to seat in predetermined positions of the axis of the globe to provide means whereby the globe and the axis thereof may be held in selected or predetermined positions with respect to the meridian.

Figure 8 illustrates a modified form of bearing mechanism between the meridian and the axis shoes. The reference numeral 44 indicates a meridian provided with an inner peripheral groove or channel 45 in which axis shoes 46 project. Each axis shoe 46 is provided with ball pockets or sockets in which bearing balls 47 are rotatably engaged and project out of the sockets and have rolling contact with the surfaces of the meridian groove or channel 45.

It will, of course, be understood that numerous details of construction may be varied through a wide range without departing from the principles of this invention, and it is, therefore, not purposed limiting the patent granted hereon otherwise than necessitated by the scope of the appended claims.

I claim as my invention:

1. A globe device comprising a standard, a meridian rigidly supported thereon, a globe ball positioned within the meridian, and an axis for the globe ball slidable longitudinally with respect to the inner periphery of the meridian to permit the globe ball and the axis thereof to be adjusted into different positions along the meridian.

2. A globe comprising a standard, a meridian rigidly supported thereon and having a longitudinal groove in the inner periphery thereof, a globe ball positioned within the meridian, and an axis for the globe ball positioned with the ends of the axis movably engaged in the groove of the meridian to permit the globe ball and the axis thereof to be moved into different positions along the meridian.

3. A globe device comprising a standard, a meridian mounted thereon, a globe ball positioned within the meridian, an axis projecting through the globe ball, and means on the ends of the axis slidable longitudinally with respect to the inner periphery of the meridian to permit the globe ball and the axis thereof to be adjusted and positioned at different degrees along the meridian.

4. A globe device comprising a standard, an inner peripherally grooved meridian mounted thereon, a globe ball positioned within the meridian, a spring-controlled sectional axis in the globe ball and having resilient slidable interfitting engagement with the meridian to permit adjustment of the globe ball and the axis longitudinally with respect to the inner periphery of said meridian, and means on the meridian for holding the axis in predetermined positions of angular adjustment.

5. A globe device comprising a support, a meridian engaged thereon having an inner peripheral groove therein, a globe ball in said meridian, a sectional axis for said globe ball, and spring means between the members forming the sectional axis to cause the outer ends of said axis members to seat in the meridian groove to permit longitudinal sliding movement along the inner periphery of the meridian to permit adjustment of the axis at different positions along the meridian.

6. A globe device comprising a base, a meridian rigidly secured thereon having a longitudinal groove therein, a globe ball in said meridian, a spring-controlled sectional axis engaged in said globe ball with the ends thereof fitting into the groove of said meridian, and means on the meridian coacting with the ends of the axis to hold the axis in different set positions of adjustment within the meridian.

7. A globe device comprising a base, a meridian mounted thereon having a longitudinal groove in the inner periphery thereof, a globe ball in said meridian, a spring-controlled sectional axis engaged diametrically in the globe ball with the ends of the axis having slidable engagement in the groove of said meridian, means on one end of the axis to facilitate shifting of the axis into different positions of adjustment along the meridian, and means on the meridian coacting with the ends of the axis to hold the axis set in different positions of adjustment.

8. A globe device comprising a base, a meridian rigidly secured thereon, and a globe ball within the meridian having the pole members thereof longitudinally slidable along the meridian to permit the axis of the globe ball to be moved to different angular positions.

9. A globe device comprising a base, a stationary meridian supported thereon having an inner peripheral groove therein, a globe ball in said meridian, a spring-controlled two-piece axis engaged in the globe ball and having slidable engagement with the meridian groove to permit the axis to be moved into different diametrical positions within the meridian and be resiliently held in said set positions by the spring action of the axis.

10. A globe device comprising a base, a longitudinally grooved stationary meridian supported thereon, a globe ball in said meridian, a spring-controlled two-piece axis engaged in the globe ball and having longitudinal slidable interfitting engagement with the grooved meridian to permit the axis to be moved into different angular positions of adjustment, and latch means adjustably mounted in the meridian for limiting the adjustable movement of said axis.

11. In a globe device of the class described, the combination with a stationary meridian, of a rotatable globe ball positioned within the meridian and having adjustable engagement therewith to permit the axis of the globe ball to be set in different diametrical positions within the meridian.

12. In a globe device of the class described, the combination with a stationary meridian, of a rotatable globe ball in the meridian, with the ends of the axis of the globe ball having longitudinal sliding engagement with the meridian to permit the axis to be shifted into different angular positions within the meridian, and spring-controlled means in the meridian for limiting the angular adjustment of the globe ball axis.

13. A globe device comprising a standard, a meridian rigidly secured thereon having an inner peripheral longitudinal groove therein, a globe ball in said meridian, a two-piece axis projecting through the globe ball, a spring positioned between the ends of the two-piece axis, guide members on the outer ends of the two-piece axis and having longitudinal sliding engagement in the groove of said meridian, a finger piece on one end of the two-piece axis to facilitate adjustment of the axis into different angular positions along the meridian, and means in the meridian coacting with the guide members on the ends of said axis to hold the axis set in different positions of adjustment.

14. A globe device comprising a standard, a meridian rigidly secured thereon having a longitudinal groove in the inner periphery thereof, a globe ball in said meridian, a two-piece axis for said globe ball, arcuate guide shoes on the ends of the two-piece axis having slidable interfitting engagement with the grooved meridian, a spring positioned between the inner ends of the pieces forming the two-piece axis to hold the arcuate guide shoes resiliently seated in the groove of said meridian, and means on the meridian coacting with the arcuate guide shoes to hold the two-piece axis set in different angular positions of adjustment along the meridian.

15. In a globe device of the class described, the combination with a mounting having an inner peripheral groove therein, of a globe ball positioned therein, and a spring-controlled two-piece axis for the globe ball slidable in said groove to permit the axis to be pivotally swung into different angular positions of adjustment within the meridian and be resiliently held in said positions.

16. The combination with a stationary meridian, of a globe ball positioned therein, and an axis for the globe ball having the ends thereof longitudinally slidable within the stationary meridian.

17. In a device of the class described, the combination with a stationary meridian, of a globe ball positioned therein, an axis for the globe ball having longitudinal movable engagement with the stationary meridian, and a finger piece on one end of the axis and projecting outwardly on opposite sides of the meridian to facilitate adjustment of the axis into different angular positions within the meridian.

18. A globe device of the class described comprising a standard, a stationary meridian rigidly secured thereon having a longitudinal groove in the inner periphery thereof, a globe ball in said meridian, a passaged axial sleeve in said globe ball, a spring in said sleeve, a two-piece axis projecting into the ends of said sleeve and having the inner ends thereof contacting the ends of said spring, arcuate guide members on the outer ends of said two-piece axis and slidably engaged in the groove of said meridian, a finger piece on one end of the axis to facilitate adjustment of the axis into different angular positions with respect to the meridian, and means on the meridian coacting with the arcuate guide members of the two-piece axis to hold the axis in predetermined positions of adjustment.

In testimony whereof I have hereunto subscribed my name at Chicago Heights, Cook County, Illinois.

ROBERT B. LAWTON.